(12) United States Patent
D'Amato et al.

(10) Patent No.: US 10,060,370 B2
(45) Date of Patent: Aug. 28, 2018

(54) ADAPTIVE MODEL PREDICTIVE CONTROL FOR VEHICLE ROUTE PLANNING

(71) Applicant: Ford Global Technologies, LLC, Dearborn, MI (US)

(72) Inventors: Anthony Mario D'Amato, Canton, MI (US); Dimitar Petrov Filev, Novi, MI (US); John Ottavio Michelini, Sterling Heights, MI (US); Jonathan Thomas Mullen, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 14/835,337

(22) Filed: Aug. 25, 2015

(65) Prior Publication Data

US 2016/0096527 A1  Apr. 7, 2016

Related U.S. Application Data

(60) Provisional application No. 62/058,851, filed on Oct. 2, 2014.

(51) Int. Cl.
| | |
|---|---|
| *F02D 41/02* | (2006.01) |
| *F02D 41/14* | (2006.01) |
| *B60W 10/00* | (2006.01) |
| *B60W 30/00* | (2006.01) |

(52) U.S. Cl.
CPC ......... *F02D 41/0215* (2013.01); *B60W 10/00* (2013.01); *B60W 30/00* (2013.01); *F02D 41/1406* (2013.01); *F02D 2200/0625* (2013.01); *F02D 2200/701* (2013.01); *F02D 2250/18* (2013.01)

(58) Field of Classification Search
CPC ............ F02D 41/0215; F02D 41/1406; F02D 2250/18; F02D 2200/0625; F02D 2200/701; F02D 2041/1423; B60W 10/00; B60W 30/00
See application file for complete search history.

(56) References Cited

U.S. PATENT DOCUMENTS

| | | | | |
|---|---|---|---|---|
| 7,016,779 B2 * | 3/2006 | Bowyer | .............. | F02D 41/0007 701/108 |
| 7,197,485 B2 * | 3/2007 | Fuller | .................. | G05B 13/048 706/12 |
| 8,504,175 B2 | 8/2013 | Pekar et al. | | |
| 9,008,858 B1 * | 4/2015 | Payne | ................ | B60H 1/00771 701/1 |
| 2009/0312889 A1 * | 12/2009 | Krupadanam | ...... | B60L 11/1859 701/1 |
| 2010/0268353 A1 * | 10/2010 | Crisalle | ................ | G05B 13/048 700/29 |

(Continued)

*Primary Examiner* — Hieu T Vo
*Assistant Examiner* — Arnold Castro
(74) *Attorney, Agent, or Firm* — Julia Voutyras; McCoy Russell LLP (57) ABSTRACT

Method and system are provided for vehicle route planning based on adaptive model predictive control. In one example, a method may include real-time online identification of the vehicle model base on the vehicle inputs and outputs; compression of the input space to increase the optimization efficiency; and optimization of the route planning based on the model parameter of the vehicle and the known road grade.

19 Claims, 5 Drawing Sheets

(56) References Cited

U.S. PATENT DOCUMENTS

| | | | | |
|---|---|---|---|---|
| 2010/0305719 | A1* | 12/2010 | Pekar | G05B 13/024 700/29 |
| 2011/0060424 | A1* | 3/2011 | Havlena | G05B 13/048 700/29 |
| 2011/0125293 | A1* | 5/2011 | Havlena | G05B 13/048 700/30 |
| 2015/0275796 | A1* | 10/2015 | Pochner | F02D 41/04 701/104 |
| 2015/0369146 | A1* | 12/2015 | Zavala Jurado | F02D 41/0205 60/605.2 |
| 2016/0339799 | A1* | 11/2016 | Hellgren | B60W 10/08 |

* cited by examiner

ADAPTIVE MODEL PREDICTIVE CONTROL FOR VEHICLE ROUTE PLANNING

CROSS REFERENCE TO RELATED APPLICATIONS

The present application claims priority to U.S. Provisional Patent Application No. 62/058,851, entitled "EFFICIENT ADAPTIVE MODEL PREDICTIVE CONTROL FOR OPTIMAL VEHICLE ROUTE PLANNING," filed Oct. 2, 2014, the entire contents of which are hereby incorporated by reference for all purposes.

FIELD

The present description relates generally to methods and systems for vehicle route planning.

BACKGROUND/SUMMARY

In advanced route planning, an optimal velocity profile of a vehicle may be computed given known disturbances along a route, for example, road grade, traffic, etc. Computation for the optimal velocity profile may be formulated into a model predictive control (MPC) problem, wherein rather than computing the entire velocity profile for the total route, the route may be broken into time horizons of a number of seconds or minutes. In the MPC problem, optimal inputs to achieve desired system outputs are computed for a given horizon. The first computed input is implemented by the vehicle system. Then, the entire time horizon is shifted forward one step, and the optimal inputs are recomputed.

One challenge in MPC is reducing the computation time. The computation time for MPC is closely related to the length of the time horizon. As the length of the time horizon increases, the computed inputs approach the optimal solution. However, a long time horizon may result in an unacceptably long computation time. For example, with a long time horizon for input optimization, solving the MPC problem in both the linear and nonlinear case may become intractable in a computational sense.

Other attempts to address the issue of long computation time in MPC include methods for increasing the optimization speed in MPC. One example approach is shown by Pekar et al. in U.S. Pat. No. 8,504,175. Therein, a cost function minimizing manipulated variables trajectories is computed with a MPC model for a relatively short time horizon in the future. The MPC uses a quadratic programming (QP) algorithm to find the optimal solution, wherein the QP algorithm is solved using an Active Sets solver (AS) class algorithm with simple constraints based on gradient projection and using a Newton step projection.

However, the inventors herein have recognized potential issues with such systems. As one example, for a given vehicle system, a long time horizon length may be necessary to obtain an adequate approximation to the optimal solution. In order to solve the MPC problem, the inputs and outputs of the model of the vehicle system are sampled. The length of the time horizon is determined by a duration of preview into the future and the sampling frequency. Higher sampling frequency leads to longer time horizon length. In order to preserve the dynamic change of the vehicle model and the model input (such as a disturbance), adequate sampling frequency is required. Thus, though a short time horizon with low sampling frequency may reduce the number of inputs to optimize, the model resolution and disturbance resolution may be lost in the process.

In one example, the issues described above may be addressed by a method of operating a vehicle responsive to a determined planned route, the planned route determined for a given time horizon to minimize fuel consumption and further based on disturbances along the planned route and according to a compressed total number of parameters of an engine torque over the given time horizon. In this way, an optimal planned route may be efficiently determined given known disturbances along the route.

As one example, during vehicle operation, vehicle parameters may be estimated online based on engine torque, one or more disturbances along the route, fuel consumption, and acceleration of the vehicle. A future engine torque may be constructed over a given time horizon, wherein the future engine torque is compressed to have a number of parameters less than the length of the time horizon. Then, each parameter of the future engine torque may be determined by minimizing a future fuel consumption. The reduced number of parameters of the future engine torque may allow faster convergence to the optimal result without sacrificing the model resolution. Further, an online torque converter modeling may be implemented to allow optimal route planning with the inclusion of discrete events requiring torque converter unlocks, such as during fuel shut off and neutral transmission operation.

The technical effect of estimating vehicle parameters online is to achieve real-time online adaptation of the vehicle model to account for changing environmental factors such as wind, vehicle mass, friction forces, aging, etc. The technical effect of compressing the number of parameters of the future engine torque is to achieve improved optimization efficiency without sacrificing model resolution and disturbance resolution. Moreover, the compression may significantly reduce the required computational resources and enable on-board implementation of the algorithm.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
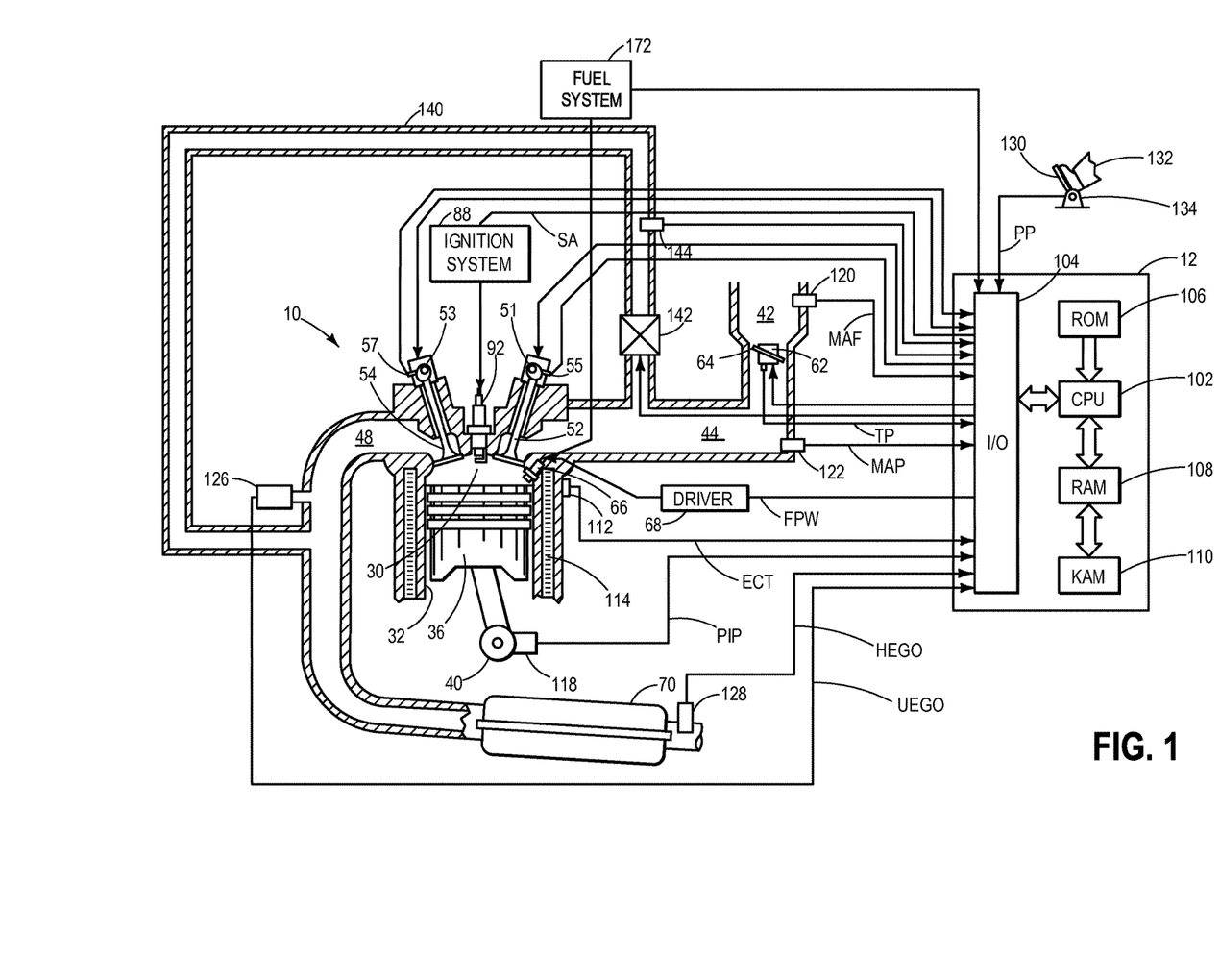
FIG. 1 schematically shows aspects of an example engine system of a vehicle.
Figure 2:
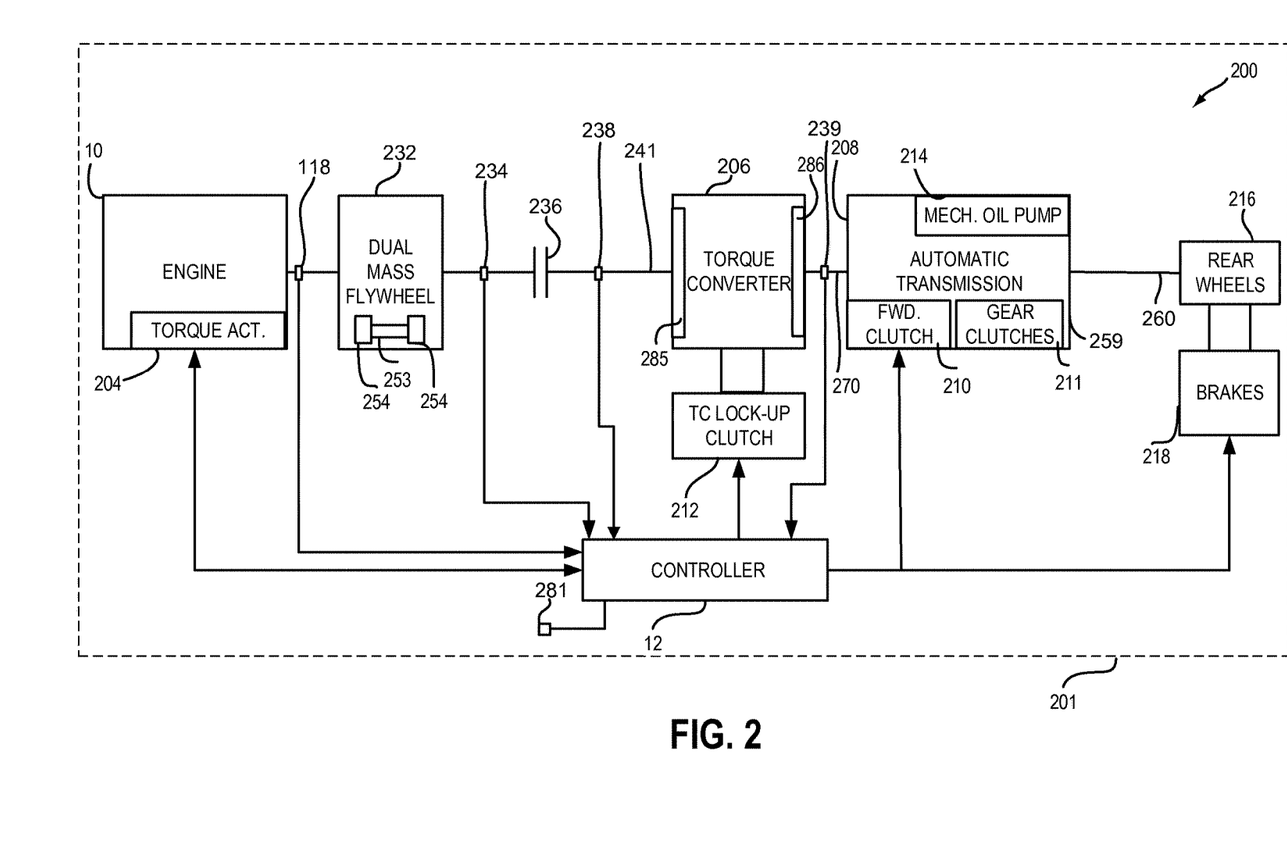
FIG. 2 shows an example vehicle driveline configuration.

The following description relates to systems and methods for determining an optimal torque profile for a vehicle given known disturbances along a route. A model predictive control problem is constructed to determine the optimal engine torque by minimizing vehicle fuel consumption over a time horizon. FIG. 1 shows an example engine system of the vehicle. FIG. 2 demonstrates an example configuration of vehicle driveline. The MPC problem constructed based on the inputs and outputs of an example vehicle model are demonstrated in a block diagram shown in FIG. 3. FIG. 4 shows an example method for determining the optimal engine torque to achieve minimized fuel consumption. FIGS. 5A and 5B demonstrate the effect of the length of time horizon on the convergence quality of the MPC solution to the optimal solution.

FIG. 1 illustrates a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a NOx, HC, or CO sensor. In one embodiment, upstream exhaust gas sensor 126 is a UEGO configured to provide output, such as a voltage signal, that is proportional to the amount of oxygen present in the exhaust. Controller 12 uses the output to determine the exhaust gas air-fuel ratio.

Emission control device 70 is shown arranged along exhaust passage 48 downstream of exhaust gas sensor 126. Device 70 may be a three way catalyst (TWC), configured to reduce NOx and oxidize CO and unburnt hydrocarbons. In some embodiments, device 70 may be a NOx trap, various other emission control devices, or combinations thereof.

A second, downstream exhaust gas sensor 128 is shown coupled to exhaust passage 48 downstream of emissions control device 70. Downstream sensor 128 may be any suitable sensor for providing an indication of exhaust gas air-fuel ratio such as a UEGO, EGO, HEGO, etc. In one embodiment, downstream sensor 128 is a HEGO configured to indicate the relative enrichment or enleanment of the exhaust gas after passing through the catalyst. As such, the HEGO may provide output in the form of a switch point, or the voltage signal at the point at which the exhaust gas switches from lean to rich.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure (MAP) signal from sensor 122. Engine speed signal, RPM, may be generated by controller 12 from signal PIP. Controller 12 also employs the various actuators of FIG. 1 to adjust engine operation based on the received signals and instructions stored on a memory of the controller.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

FIG. 2 is a block diagram of a vehicle 201 and vehicle driveline 200. Driveline 200 may be powered by engine 10. Engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232.

The downstream side of disconnect clutch 236 is mechanically coupled to the impeller 285 of torque converter 206 via shaft 241. Position sensor 238 is coupled to shaft 241. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply or engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also receive external disturbance information from sensor 281. The external disturbance information may include road grade along the route and traffic condition.

Figure 3:
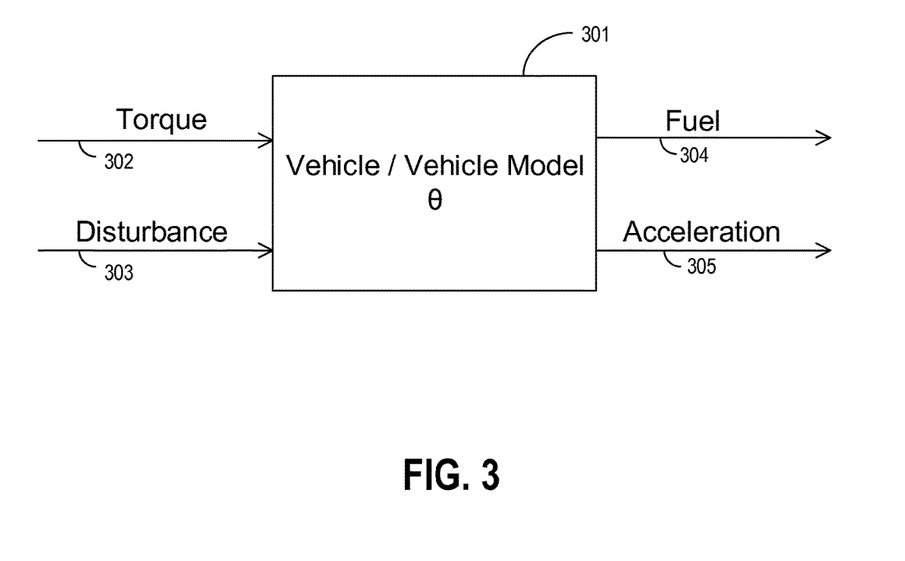
FIG. 3 shows a block diagram of an example vehicle model.
Figure 4:
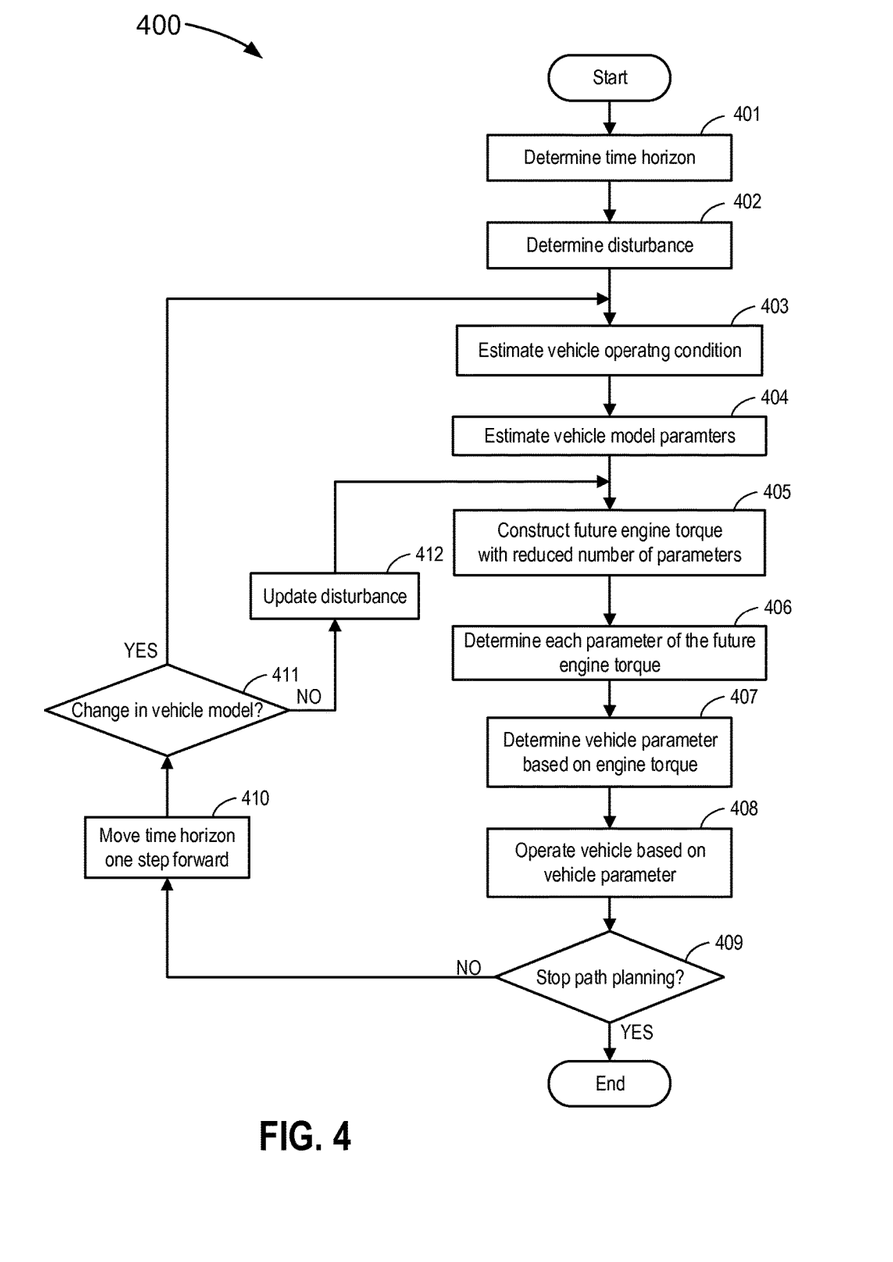
FIG. 4 shows an example method for determining an optimal route planning for a given route.
Figure 5A:
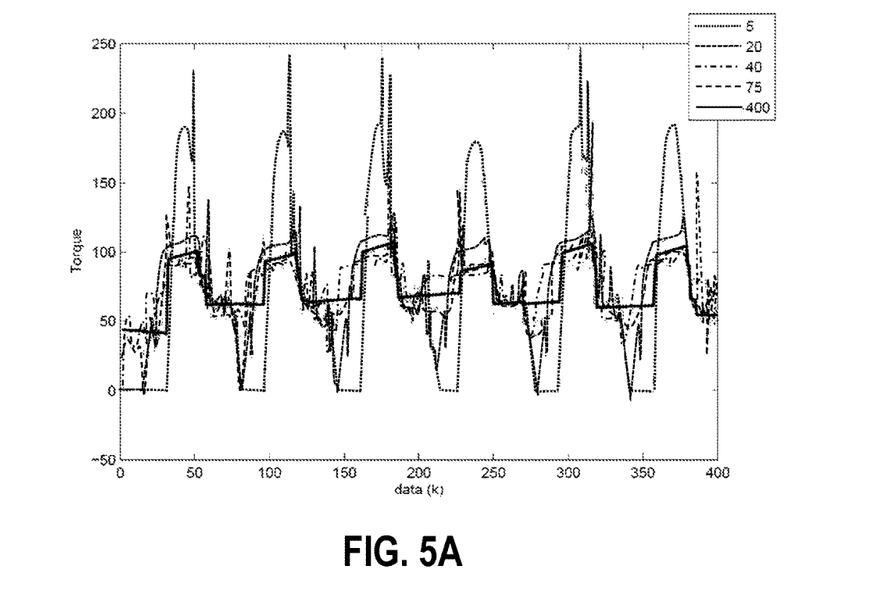
FIGS. 5A and 5B demonstrate results of a model predictive control problem computed with different time horizon lengths.
Figure 5B:
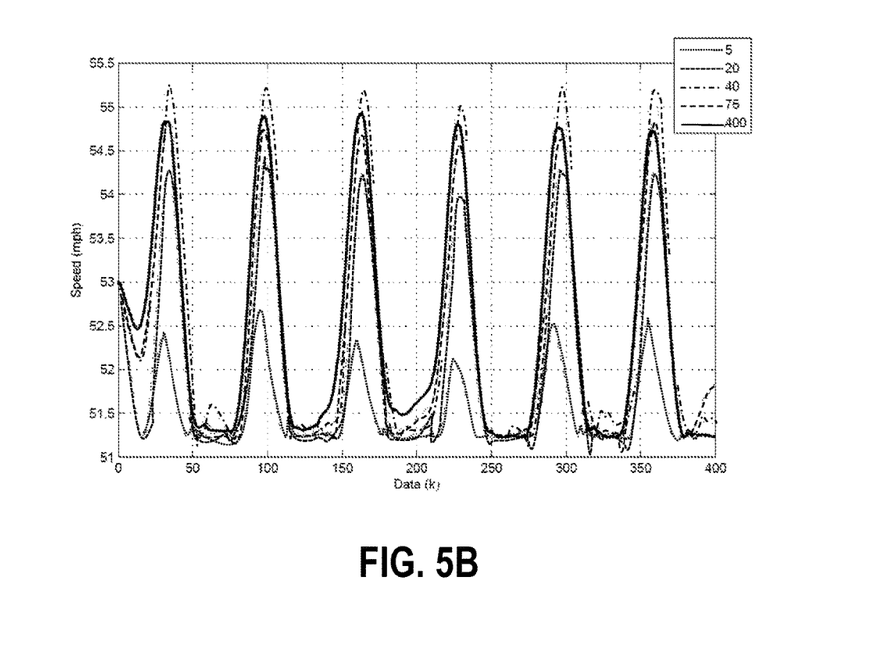

FIGS. 3-4 relate to an example method of determining a planned route by minimizing fuel consumption through MPC given known disturbance along the route. The MPC problem is constructed based on a vehicle model with inputs and outputs shown in FIG. 3. The flow chart in FIG. 4 shows a method 400 of determining an optimal engine torque input to achieve a desired fuel consumption. Instructions for carrying out method 400 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

Turning to FIG. 3, FIG. 3 shows a block diagram of the inputs and outputs of vehicle model 301 under consideration in this work, where the input u(k) is torque 302, d(k) is a disturbance 303, and the outputs y(k) are the fuel 304 and acceleration 305 of the vehicle. As an example, the disturbance may be road grade. Consider the nonlinear vehicle model given by $$\begin{bmatrix} a(k) \\ f_u(k) \end{bmatrix} = f(T(k-1), d(k-1)), \quad (1)$$

where a(k) is the vehicle acceleration, $f_u(k)$ is the fuel consumption, T(k) is the engine torque, and d(k) is the road grade. f(•) is a nonlinear mapping between the inputs and outputs and accounts for vehicle physics including mass, headwind, friction, etc.

Using the linearization of (1) with unknown vehicle model parameters given by $$\begin{bmatrix} a(k) \\ f_u(k) \end{bmatrix} = \theta \begin{bmatrix} T(k-1) \\ d(k|-1) \end{bmatrix},$$

Where $\theta \in \mathbb{R}^{l_y \times n(l_u+l_y+l_d)}$ are the linear vehicle model parameters.

Consider the linear time-invariant system with the following inputs and output relationship $$y(k) = [\theta_1 \theta_2 \theta_3] \phi(k-1), \quad (2)$$

where $y(k) \in \mathbb{R}^{l_y}$ are the outputs, $\theta_1 \in \mathbb{R}^{l_y \times l_u}$, $\theta_2 \in \mathbb{R}^{l_y \times l_d}$, $\theta_3 \in \mathbb{R}^{l_y \times n(l_y+l_u+l_d)-l_u-l_d}$ are model parameters, $$\phi(k-1) = \begin{bmatrix} u(k-1) \\ d(k-1) \\ y(k-1) \\ \vdots \\ u(k-n) \\ d(k-n) \\ y(k-n) \end{bmatrix} \in \mathbb{R}^{n(l_u+l_y+l_d)},$$

$u(k) \in \mathbb{R}^{l_u}$ are the control inputs, $d(k) \in \mathbb{R}^{l_d}$ are known disturbances, and $\theta = [\theta_1 \theta_2 \theta_3]$.

A MPC problem may be established to determine an optimal engine torque for minimizing the fuel consumption $f_u(k)$. The objective of the MPC problem is to determine the torque inputs (k), . . . , T(k+r), where r is the length of a time horizon into the future, such that $f_u(k+r)$ is minimized in the presence of road grade d(k), . . . , d(k+r), and vehicle physics f(•). Here, the inputs and outputs are referred to using standard notation, specifically, the outputs a(k) and $f_u(k)$ are collectively referred to as y(k), the input T(k) is u(k), and the known disturbance d(k) is road grade.

At first, consider the state-space realization of (2), $x(k+1) = Ax(k) + B_1 u(k) + B_2 d(k),$ $y(k) = Cx(k),$ where $$A = \begin{bmatrix} \theta_3 \\ 0_{l_u+l_d \times n(l_y+l_u+l_d)-l_u-l_d} \\ I_{n(l_u+l_y+l_d)-l_y} \quad 0_{n(l_u+l_y+l_d)-l_y \times l_y+l_u+l_d} \end{bmatrix},$$

$$B_1 = \begin{bmatrix} \theta_1 \\ I_{l_u} \\ 0_{n(l_u+l_y+l_d)-l_y \times l_u} \end{bmatrix},$$

$$B_2 = \begin{bmatrix} \theta_2 \\ 0_{l_u \times l_d} \\ I_{l_d} \\ 0_{n(l_u+l_y)-l_y \times l_d} \end{bmatrix},$$

$C = [I_{l_y} \quad 0_{l_y \times n(l_u+l_y+l_d)-l_u-l_d}].$

Next, from the solution of linear systems one can write the system output r data steps into the future as $y(k+r+1) = CA^r x(k) + HU(k+r) + H_2 D(k+r)$ Where $$U(k+r) = \begin{bmatrix} u(k) \\ \vdots \\ u(k+1) \end{bmatrix},$$

$H_1 = [CA^r B_1 \quad \ldots \quad CAB_1 \quad CB_1],$ and $$D(k+r) = \begin{bmatrix} d(k) \\ \vdots \\ d(k+r) \end{bmatrix},$$

$H_2 = [CA^r B_2 \quad \ldots \quad CAB_2 \quad CB_2].$

The system output at each intermediate step between k and k+r can be written as $Y(k+r+1) = \overline{A} x(k) + \overline{H}_1 U(k+r) + \overline{H}_2 D(k+r),$ where $$Y(k+r) = \begin{bmatrix} y(k) \\ \vdots \\ y(k+r+1) \end{bmatrix},$$

$$\overline{A} = \begin{bmatrix} CA \\ \ldots \\ CA^r \end{bmatrix},$$

$$\overline{H}_1 = \begin{bmatrix} CA^r B_1 & \ldots & CAB_1 & CB_1 \\ 0 & \ddots & \ddots & \vdots \\ \vdots & \ddots & CAB_1 & CB_1 \\ 0 & 0 & 0 & CB_1 \end{bmatrix},$$

$$\overline{H}_2 = \begin{bmatrix} CA^r B_2 & \ldots & CAB_2 & CB_2 \\ 0 & \ddots & \ddots & \vdots \\ \vdots & \ddots & CAB_2 & CB_2 \\ 0 & 0 & 0 & CB_2 \end{bmatrix}.$$

Finally, assuming the desired output of the system is $y^*(k) \in \mathbb{R}^{l_y}$, the controls that provide the ideal output are $u^*(k) \in \mathbb{R}^{l_u}$ and $u^*(k)$ maybe computed by solving the linear program with respect to $U^*(k+r)$ $$\min \|Y^*(k+r+1) - \bar{A}x(k) - \bar{H}_2 D(k+r) - \bar{H}_1 U^*(k+r)\|$$

$$s \cdot j \cdot EU^*(k+r) = G$$

$$LU^*(k+r) \leq F, \quad (3)$$

where $E \in \mathbb{R}^{l \times l_u}$, $G \in \mathbb{R}^l$, $L \in \mathbb{R}^{j \times l_u}$, and $F \in \mathbb{R}^j$ are constraint matrices. The optimization problem (3) can be solved analytically in the absence of the L and F using Lagrangian methods. Otherwise, a number of software solvers and packages are commercially available for example, MATLAB functions fmincon, lsqlin, etc.

Note that regardless of the optimization package used for a given horizon r, the number of parameters to optimize is $rl_u$. The computation time for solving the optimization problem (3) may be very long given a long time horizon.

FIG. 4 is a flow chart illustrating method 400 for determining the planned route in real-time with known disturbance along the route. Method 400 expedites the computation time for the planned route by compressing the input space of the optimization problem (3).

At step 401, a time horizon for the MPC problem is determined. The time horizon is determined based on a duration of preview into the future and a sampling frequency on the inputs and outs of the vehicle model. For example, consider a case where a 0.5 second sampling time is used. If the required duration of preview is 80 seconds into the future, a time horizon with a length of 160 is required. The preview duration and the sampling frequency may be pre-defined based on the required approximation quality and resolution of the optimization. The sampling frequency may further be limited by the sensors of the vehicle system. Generally, a better approximation quality requires longer time horizon. For example, FIGS. 5A and 5B demonstrate resulting engine torque and vehicle velocity computed through a MPC problem by minimizing fuel consumption, with constraints on the minimum and maximum vehicle velocity. The torque and vehicle velocity is computed over time horizons lengths of 5 k, 20 k, 40 k, and 75 k. With increased time horizon length, both the torque and the vehicle velocity converge to the optimal solution which is computed over the entire data length (400 k data points).

At step 402, disturbance along the route may be determined and stored inside the non-transitory memory of the controller. The disturbance may include road grade and traffic condition along the route. The disturbance information may be pre-determined and acquired from a data base. The disturbance may also be updated based on the sensed information acquired in real-time from a sensor (such as sensor 281 in FIG. 2).

At step 403, vehicle operating conditions are estimated and stored inside the non-transitory memory of the controller. The vehicle operating conditions may include vehicle torque, fuel consumption, and vehicle acceleration. The vehicle operating conditions may further include but are not limited to condition of the torque converter lock-up clutch, ambient temperature and pressure, engine speed and load, vehicle speed, brake pedal position, accelerator pedal position, engine temperature, and the like.

At step 404, vehicle model parameters are estimated based on the inputs and outputs of the vehicle model shown in FIG. 3. Specifically, vehicle model parameters are estimated based on the current and past engine torque, disturbance, fuel consumption, and acceleration stored in the non-transitory memory of the controller.

As an example, assuming that the inputs u(k), and outputs y(k) can be measured and the disturbance d(k) is known, then the model parameters θ can be estimated recursively using the update equations $$\hat{\theta}(k) \triangleq \hat{\theta}(k-1) + [\hat{\theta}(k-1)\phi(k-1) - \gamma(k-1)][\phi^T(k-1)P(k-1)\phi(k-1) + \lambda]^{-1} \cdot \phi^T(k-1)P(k-1),$$

where $\hat{\theta}(k)$ is an estimate of θ, $\lambda \in (0, 1]$ is the forgetting factor, and $P(k) \in \mathbb{R}^{n \times n}$ is updated by $$P(k) \triangleq \lambda^{-1} P(k-1) - \lambda^{-1} P(k-1)\phi(k-1)[\phi^T(k-1)P(k-1)\phi(k-1) + \lambda]^{-1} \phi^T(k-1)P(k-1).$$

The covariance can be initialized as $P(0) = \delta I$, where $\delta > 0$.

Note that the model parameters θ can be estimated using a number of identification techniques, including batch least squares, which may provide better estimates in the presence of nonlinearities at the sacrifice of increased memory usage.

In optimal trajectory planning, it is sometimes advantageous to enter a state of fuel shut off (DFSO), or disengaging the powertrain (neutral). While the vehicle model is valid for both of these discrete events, when exiting these modes the torque converter maybe unlocked. In this regime the vehicle model is no longer valid, that is, the torque must be multiplied by a positive number less than 1, representing a loss of energy to the torque converter.

For these cases, an augmented vehicle model that captures the dynamics of the torque converter unlock is established. The augmented vehicle model may maintain a model structure which is linear in the parameters, and therefore can be easily identified online.

As an example, consider the possibly nonlinear model structure representing the vehicle dynamics with the torque converter in the locked state, $$a(k) = \Theta_1(T(k-1), \delta(k-1)),$$

where a(k) is the vehicle acceleration, and $\Theta_1$ is either linear or linear in the parameters. Next, consider the second model $$a(k) = \Theta_2(\varepsilon T(k-1), \delta(k-1)),$$

which models the vehicle dynamics with the torque converter at maximum slip, where $0 \leq \varepsilon < 1$ is the minimum torque converter slip efficiency. The augmented model structure becomes the weighted sum $$a(k) = e^{\tau_1 \|n(k)\|} \Theta_1(T(k-1), \delta(k-1)) + e^{\tau_2 \|1-n(k)\|} \Theta_2(\varepsilon T(k-1), \delta(k-1)), \quad (4)$$

where $\tau_1$ and $\tau_2$ are spread parameters and n(k) is the output of the torque converter lock up response, specifically $$n(k) = G(z)[V(k) - \psi RPM(k)], \quad (5)$$

where G(z) is an asymptotically stable transfer function, ideally of finite impulse response. ψ is the final drive ratio and RPM(k) is the engine speed. Note that as the converter locks, $V(k) - \psi RPM(k) \to 0$, and $\Theta_1$ dominates the acceleration model. Alternatively, n(k) maybe defined as $$n(k) = G(z)\nu(k), \quad (6)$$

where G(z) is an asymptotically stable transfer function, ideally of finite impulse response. $\nu(k) \in \{0, 1\}$ is an impulse signal such that $\nu(k) = 1$ for a single time step k when existing a discrete event, $\nu(k) = 0$ for all other instances.

At step 405, future engine torque over the time horizon is constructed with a number of parameters less than the length of the time horizon. In other words, the input space is compressed to achieve improved optimization efficiency. The compressed input space is based on kernel factors generated from a bank of basis vectors. The bank of basis vectors automatically summarizes the optimal control profiles that are calculated by the MPC algorithm in order to initialize the algorithm at the launch of the MPC control or when covariance resetting is performed. As such, MPC problem may be efficiently and robustly solved.

In an example, consider the functional form of the input u(k). Specifically, let $$u(k)=[\gamma_1(k) \ldots \gamma_p(k)]\bar{\alpha}, \quad (7)$$

where $$\bar{\alpha} = \begin{bmatrix} \alpha_1 \\ \vdots \\ \alpha_p \end{bmatrix},$$

for $i=1, \ldots, p$, $$\gamma_i(k) = \begin{bmatrix} \frac{e^{\rho_{1,i}\|c_1\|^{-k}\|}}{\sum_{j=1}^{p} e^{\rho_{1,i}\|c_{1,j}^{-k}\|}} & 0 & 0 \\ 0 & \ddots & 0 \\ 0 & 0 & \frac{e^{\rho_{l_u,i}\|c_{l_u,i}^{-k}\|}}{\sum_{j=1}^{p} e^{\rho_{l_u,j}\|c_{l_u,j}^{-k}\|}} \end{bmatrix},$$

where $\rho$ is the kernel spread and c is the kernel center and for $i=1, \ldots, p$, $\alpha_i$ are the kernel coefficients. Next using (7), torque r data steps into the future U*(k+r) can be approximated by $$U^*(k+r)=\Gamma(k+r)\bar{\alpha}, \quad (8)$$

where $$\Gamma(k+r) = \begin{bmatrix} \gamma_1(k) & \ldots & \gamma_p(k) \\ \vdots & \vdots & \vdots \\ \gamma_1(k+r) & \ldots & \gamma_p(k+r) \end{bmatrix}.$$

Assuming p<r, the resulting number of parameters to optimize is reduced to p resulting in improved optimization efficiency.

As another example, Fourier series approximation may be used for compressing the input space. Specifically, u(k) may be approximated in Fourier series such as $$u(k) = \alpha_1 + \sum_{i=2}^{2p+1} [\alpha_i \sin(\omega_i k) + \alpha_{i+1} \cos(\omega_i k)],$$

where for $i=1, \ldots, p$, $\omega_i$ are preselected frequencies. The input sequence U*(k+r) is then approximated by $$U^*(k+r)=\Gamma(k+r)\bar{\alpha},$$

where $$\Gamma(k+r) = \begin{bmatrix} 1 & \sin(\omega_1 k) & \cos(\omega_1 k) & \ldots & \sin(\omega_p k) & \cos(\omega_p k) \\ 1 & \sin(\omega_1(k+1)) & \cos(\omega_1(k+1)) & \ldots & \sin(\omega_p(k+1)) & \cos(\omega_p(k+1)) \\ \vdots & & & \ldots & & \vdots \\ 1 & \sin(\omega_1(k+r)) & \cos(\omega_1(k+r)) & \ldots & \sin(\omega_p(k+1)) & \cos(\omega_p(k+1)) \end{bmatrix} \quad (9)$$

and $$\bar{\alpha} = \begin{bmatrix} \alpha_1 \\ \vdots \\ \alpha_{2p+1} \end{bmatrix}. \quad (10)$$

wherein the dimension of input may be reduced from r to 2p+1.

The kernel coefficients $\alpha_i$ in the above examples can may be initialized based on a bank of basis vectors, and further updated with updated disturbance. The bank consists of a set of concatenated vectors of kernel coefficients $\alpha$ and corresponding vectors of the measured disturbance (road grade) D.

The bank is continually updated by real time clustering of the instantaneous vectors of kernel coefficients $\alpha(k)$ and corresponding vectors $D(k+r)$ of the previewed measured disturbance (road grade). This is accomplished by applying a summarization algorithm that is derived from the k-Nearest Neighbor algorithm:

1. The very first vector of kernel coefficients $\alpha(k)$ and the corresponding vector of previewed road grades $D(k)=[d(k+1) \ldots d(k+r)]^T$ establish the first basis vector of the bank, i.e. the first cluster center:

$$m=1, [(\alpha^m)^T(d^m)^T]^T=[\alpha(k)^T D(k)^T]^T.$$

2. Assume there are already established m cluster centers $[(\alpha^i)^T(D^i)^T]^T$, $i=[1, m]$, and $\alpha(k+p)$ is the vector of kernel coefficients learned at (k+p). Let $$j = \underset{i}{\operatorname{argmin}} \|\alpha(k+p) - \alpha^i\|,$$

$$i = [1, m].$$

i. If $\|\alpha(k+p)-\alpha^i\|<\varepsilon_R$, the vector $\alpha(k+p)$ and $D(k+p)$ update the closest j-th cluster center as follows:

$$\alpha^j := (1-\kappa)\alpha^j + \kappa\alpha(k+p),$$

$$D^j := (1-\kappa)D^j + \kappa D(k+p).$$

ii. If $\min\|\alpha(k+p)-\alpha^i\|\geq\varepsilon_R$, the vectors $\alpha(k+p)$ and $D(k+p)$ create a new (m+1)-th cluster center as follows:

$$m=m+1, [(\alpha^m)^T(d^m)^T]^T=[\alpha(k+p)^T D(k+p)^T]^T.$$

The cluster centers can be used to initialize the vector of kernel coefficients for a specific grade at the start of the algorithm or after resetting the covariance in the RLS algorithm for learning the model. Interpolation is done proportionally to the inverse distance between the current grade preview vector and the basis grade vectors in the bank:

$$\alpha(k) = \frac{\sum_{i=1}^{m} \tau_i(k)\alpha^i}{\sum_{i=1}^{m} \tau_i(k)},$$

where $$\tau_i(k) = \exp\left(-\frac{\|D(k) - D^i\|}{\sigma^2}\right),$$

$$i = [1, m].$$

Constants $\varepsilon_R$, $\sigma$, and $\kappa$ define the granularity of the clusters and the rate of updating the cluster centers.

At step 506, each parameter of the future engine torque may be determined by applying the compressed input from step 505 into the optimization of MPC.

As an example, for a linear system, substituting (8) into (3) results in the augmented optimization problem $$\min\|Y^*(k+r+1)-\overline{A}x(k)-\overline{H}_1D(k+r)-\overline{H}_1\Gamma^*(k+r)\overline{\alpha}\|$$

$$s \cdot j \cdot E\Gamma(k+r)\overline{\alpha}=G$$

$$L\Gamma(k+r)\overline{\alpha}<F. \quad (11)$$

Assuming p<r, by substituting (8) into (3), the resulting number of parameters to optimize is reduced to p resulting in improved optimization efficiency.

As another example, for optimization of time-domain trajectories for nonlinear systems, that is, consider the nonlinear system representation $$Y(k+r)=f(D(k+r),U(k+r)), \quad (12)$$

where the optimization goal is set up similar to (3) as $$\min\|Y^*(k+r+1)-f(D(k+r),U^*(k+r))\|$$

$$s \cdot j \cdot EU^*(k+r)=G$$

$$LU^*(k+r)<F, \quad (13)$$

then, using input compression, (13) becomes $$\min\|Y^*(k+r+1)-f(D(k+r),\overline{H}_1\Gamma^*(k+r)\overline{\alpha}\|$$

$$s \cdot j \cdot E\Gamma(k+r)\overline{\alpha}=G$$

$$L\Gamma(k+r)\overline{\alpha}<F. \quad (14)$$

At step 407, vehicle parameter is determined based on the first parameter of the future engine torque determined in step 406. In other words, by operating the vehicle with the determined vehicle parameter, torque output of the vehicle may be the same as the first parameter of the future engine torque determined in step 406. Then, the vehicle is operated according to the vehicle parameter determined in step 408. The vehicle parameter may include a combination of spark timing, fuel pulse width, fuel pulse timing, air charge, throttle opening, valve timing, valve lift, and boost for turbo- or super-charged engines.

After step 408, method 400 determines whether to stop path planning at step 409. As an example, the path planning may be stopped if the vehicle is stopped. As another example, the path planning may be stopped by an operator of the vehicle. If the controller determines that path planning should stop, method 400 ends. Otherwise, method 400 moves to step 410 to move the time horizon one step forward.

At step 410, the controller determines whether there is any change in the vehicle model. As an example, the controller determines if there is a change in the external environmental factors, such as vehicle mass, wind, or friction forces. As another example, the controller determines if there is a change in the operation of the torque converter. If there is a change in the vehicle model, method 400 moves to step 403, wherein the vehicle model parameters are re-estimated. If there is no change in the environmental factors, method 400 moves to step 412 to update the disturbance along the route.

At step 412, the disturbance along the route may be updated based on sensor input in real-time. Then, method 400 moves to step 405 for updating the bank of basis vectors and re-computing for the future engine torque.

In this way, the methods described in this work provide several advantages over existing techniques for route planning optimization. Specifically, the compression of the input space allows the user to utilize very large time horizons without sacrificing disturbance or model resolution. Summarization of the optimal trajectories with respect to a given grade profile and model allows for initialization and fast convergence of optimization algorithms. Furthermore adaptation of a physics based model allows optimization algorithms to account for changing vehicle mass, scale and bias in grade estimate, wind, friction drag forces, and vehicle aging.

A method, comprising: operating a vehicle parameter responsive to a determined planned route, the planned route determined for a given time horizon to minimize fuel consumption and further based on disturbance along the planned route and according to a compressed total number of parameters of an engine torque over the given time horizon. In a first example of the method the total number of parameters of the engine torque is less than a length of the given time horizon. A second example of the method optionally includes the first example and further includes that the planned route is further determined based on a vehicle model estimated while operating the vehicle. A third example of the method optionally includes one or more or each of the first example and second example, and further includes wherein the vehicle model is estimated through recursive least square estimation based on the engine torque, the disturbance, the fuel consumption, and an acceleration of the vehicle. A fourth example of the method optionally includes one or more or each of the first through third examples, and further includes wherein the vehicle model is corrected based on an output of torque converter lock up response during discrete events when a torque converter unlocks. A fifth example of the method optionally includes one or more or each of the first through fourth examples, and further includes wherein the total number of parameters of the engine torque is compressed based on kernel vector coefficients derived from a bank of basis vectors. A sixth example of the method optionally includes one or more or each of the first through fifth examples, and further includes wherein the bank of basis vectors is updated in real time based on current kernel vector coefficients and future disturbance. A seventh example of the method optionally includes one or more or each of the first through sixth examples, and further includes wherein the kernel vector coefficients are initialized based on the bank of basis vectors before minimizing the fuel consumption. An eighth example of the method optionally includes one or more or each of the first through seventh examples, and further includes wherein the kernel vector coefficients are initialized based on the bank of basis vectors after resetting a covariance when estimating the model parameter. A ninth example of the method optionally includes one or more or each of the first through eighth examples, and further includes wherein the planed route is determined based on a constraint on the engine torque.

A method for a vehicle, comprising: during vehicle operation, estimating vehicle model parameters based on an engine torque, a disturbance along a route, a fuel consumption, and a vehicle acceleration; determining a time horizon; constructing a future engine torque over the time horizon, wherein the future engine torque has a number of parameters less than a length of the time horizon; determining each parameter of the future engine torque to provide a desired fuel consumption; operating the vehicle based on the future engine torque; and moving the time horizon forward. In a first example of the method each parameter of the future engine torque is determined based on a constraint on the future engine torque. A second example of the method optionally includes the first example and further includes wherein the future engine torque is constructed based on kernel vector coefficients generated from the disturbance. A third example of the method optionally includes one or more or each of the first example and second example, and further includes wherein the kernel vector coefficients are generated based on a bank of basis vectors derived from the disturbance. A fourth example of the method optionally includes one or more or each of the first through third examples, and further includes wherein the bank of basis vectors is updated based on current kernel vector coefficients and future disturbance. A fifth example of the method optionally includes one or more or each of the first through fourth examples, and further includes wherein the acceleration of the vehicle is modeled based on a first model with a torque converter locked and a second model with the torque converter unlocked. A sixth example of the method optionally includes one or more or each of the first through fifth examples, and further includes wherein the disturbance is a road grade.

A vehicle system, comprising: a torque converter for transmitting an engine torque to a drive train; a sensor for sensing a disturbance alone a route; and a controller configured with computer readable instructions stored on non-transitory memory for: estimating an engine torque; estimating a fuel consumption; estimating an acceleration of the vehicle system; determining a time horizon; reducing a total number of parameters of the engine torque over the time horizon based on the sensed disturbance, wherein the total number of parameters is less than a length of the determined time horizon; estimating vehicle model parameters based on the engine torque, the estimated fuel consumption, the estimated acceleration of the vehicle, and the sensed disturbance; determining each parameter of a future engine torque with the reduced total number of parameters by minimizing a future fuel consumption; operating the vehicle based on the first parameter of the future engine torque; and moving the time horizon forward. In a first example of the method, wherein the compression is based on kernel vector coefficients derived from a bank of basis vectors, and the bank of basis vectors is updated in response to the sensed disturbance. A second example of the method optionally includes the first example and further includes wherein the acceleration of the vehicle is estimated based on the estimated engine torque, and is corrected when the torque converter is unlocked.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a vehicle parameter responsive to a determined planned route, the planned route determined for a given time horizon to reduce fuel consumption and further based on disturbances along the planned route and according to a compressed total number of parameters of an engine torque over the given time horizon, the total number of parameters of the engine torque being less than a number of data points of the given time horizon.

2. The method of claim 1, wherein the planned route is determined based on a constraint on the engine torque.

3. The method of claim 1, wherein the planned route is further determined based on a vehicle model estimated while operating a vehicle.

4. The method of claim 3, wherein the vehicle model is estimated through recursive least square estimation based on the engine torque, the disturbance, the fuel consumption, and an acceleration of the vehicle.

5. The method of claim 3, wherein the vehicle model is corrected based on an output of torque converter lock up response during discrete events when a torque converter unlocks.

6. The method of claim 1, wherein the total number of parameters of the engine torque is compressed based on kernel vector coefficients derived from a bank of basis vectors.

7. The method of claim 6, wherein the bank of basis vectors is updated in real time based on current kernel vector coefficients and future disturbance.

8. The method of claim 6, wherein the kernel vector coefficients are initialized based on the bank of basis vectors before minimizing the fuel consumption.

9. The method of claim 6, wherein the kernel vector coefficients are initialized based on the bank of basis vectors after resetting a covariance when estimating a model parameter.

10. A method for a vehicle, comprising:
during vehicle operation, estimating vehicle model parameters based on an engine torque, a disturbance along a route, a fuel consumption, and a vehicle acceleration;
determining a time horizon;
constructing a future engine torque over the time horizon, wherein the future engine torque has a number of parameters less than a length of the time horizon, wherein the length of the time horizon is a number of data points in the time horizon;
determining each parameter of the future engine torque to provide a desired fuel consumption;
operating the vehicle based on the future engine torque; and
moving the time horizon forward.

11. The method of claim 10, wherein the disturbance is a road grade.

12. The method of claim 10, wherein each parameter of the future engine torque is determined based on a constraint on the future engine torque.

13. The method of claim 10, wherein the future engine torque is constructed based on kernel vector coefficients generated from the disturbance.

14. The method of claim 13, wherein the kernel vector coefficients are generated based on a bank of basis vectors derived from the disturbance.

15. The method of claim 14, wherein the bank of basis vectors is updated based on current kernel vector coefficients and future disturbance.

16. The method of claim 15, wherein the acceleration of the vehicle is modeled based on a first model with a torque converter locked and a second model with the torque converter unlocked.

17. A vehicle system, comprising:
a torque converter for transmitting an engine torque to a drive train;
a sensor for sensing a disturbance along a route; and
a controller configured with computer readable instructions stored on non-transitory memory for:
estimating an engine torque;
estimating a fuel consumption;
estimating an acceleration of the vehicle system;
determining a time horizon;
reducing a total number of parameters of the engine torque over the time horizon based on the sensed disturbance, wherein the total number of parameters is less than a length of the determined time horizon, wherein the length of the determined time horizon is a number of data points in the determined time horizon;
estimating vehicle model parameters based on the engine torque, the estimated fuel consumption, the estimated acceleration of the vehicle system, and the sensed disturbance;
determining each parameter of a future engine torque with the reduced total number of parameters by minimizing a future fuel consumption;
operating the vehicle system based on a first parameter of the future engine torque; and
moving the time horizon forward.

18. The method of claim 17, wherein the acceleration of the vehicle system is estimated based on the estimated engine torque, and is corrected when the torque converter is unlocked.

19. The method of claim 17, wherein a compression is based on kernel vector coefficients derived from a bank of basis vectors, and the bank of basis vectors is updated in response to the sensed disturbance.

* * * * *